US012682748B2

(12) United States Patent
Faubel et al.

(10) Patent No.: US 12,682,748 B2
(45) Date of Patent: Jul. 14, 2026

(54) SYSTEM AND METHOD FOR INTEGRATED EMERGENCY VEHICLE DETECTION AND LOCALIZATION

(71) Applicant: Cerence Operating Company, Burlington, MA (US)

(72) Inventors: Friedrich Faubel, Ulm (DE); Philipp Bulling, Ulm (DE); Nico Untereiner, Ulm (DE)

(73) Assignee: Cerence Operating Company, Burlington, MA (US)

( * ) Notice: Subject to any disclaimer, the term of this patent is extended or adjusted under 35 U.S.C. 154(b) by 472 days.

(21) Appl. No.: 17/908,557

(22) PCT Filed: Mar. 5, 2021

(86) PCT No.: PCT/US2021/021020
§ 371 (c)(1),
(2) Date: Sep. 1, 2022

(87) PCT Pub. No.: WO2021/178754
PCT Pub. Date: Sep. 10, 2021

(65) Prior Publication Data
US 2023/0128993 A1     Apr. 27, 2023

Related U.S. Application Data

(60) Provisional application No. 62/986,018, filed on Mar. 6, 2020.

(51) Int. Cl.
*G08G 1/04* (2006.01)
*G01S 3/801* (2006.01)
*H04R 1/40* (2006.01)

(52) U.S. Cl.
CPC ............... *G08G 1/04* (2013.01); *G01S 3/801* (2013.01); *H04R 1/406* (2013.01)

(58) Field of Classification Search
None
See application file for complete search history.

(56) References Cited

U.S. PATENT DOCUMENTS

| | | | | |
|---|---|---|---|---|
| 7,969,821 | B2 * | 6/2011 | Yonak | G01S 5/18 367/129 |
| 9,397,630 | B2 * | 7/2016 | Wang | H03G 9/025 |
| 9,971,012 | B2 * | 5/2018 | Nakamura | G01S 3/802 |
| 10,049,157 | B2 * | 8/2018 | Vrazic | G06F 16/683 |
| 10,319,228 | B2 * | 6/2019 | Silver | G08G 1/0965 |
| 10,830,914 | B2 * | 11/2020 | Myers | G10K 11/26 |
| 2010/0208902 | A1 * | 8/2010 | Yoshizawa | G10L 21/0208 381/56 |
| 2019/0172478 | A1 * | 6/2019 | Moore | G01S 3/8083 |
| 2020/0379108 | A1 * | 12/2020 | Vijayalingam | G06V 20/58 |

(Continued)

FOREIGN PATENT DOCUMENTS

WO     20190239667 A1     12/2019

OTHER PUBLICATIONS

International Search Report, PCT Application No. PCT/US2021/021020, mailed Jun. 18, 2021 (3 pages).

*Primary Examiner* — Helal A Algahaim
*Assistant Examiner* — Vikas Atmakuri
(74) *Attorney, Agent, or Firm* — Burr & Forman

(57)     ABSTRACT

A siren detector identifies those frequencies at which a siren is active and a localizer localizes the siren based on those frequencies.

16 Claims, 4 Drawing Sheets

(56) References Cited

U.S. PATENT DOCUMENTS

| 2021/0120333 | A1* | 4/2021 | Hirose | H04R 1/40 |
| 2022/0122620 | A1* | 4/2022 | Watkins | G10L 25/30 |
| 2022/0157165 | A1* | 5/2022 | Dantrey | G06N 3/047 |
| 2022/0284919 | A1* | 9/2022 | Buddhadev | G10L 25/24 |

* cited by examiner

SYSTEM AND METHOD FOR INTEGRATED EMERGENCY VEHICLE DETECTION AND LOCALIZATION

This application is a U.S. National Phase of International Application No. PCT/US2021/021020, filed on Mar. 5, 2021, which claims the benefit of the Mar. 6, 2020 priority date of U.S. Provisional Application 62/986,018, the contents of which are incorporated herein by reference.

RELATED APPLICATIONS

This application claims the benefit of the Mar. 6, 2020 priority date of U.S. Provisional Application 62/986,018, the contents of which are herein incorporated by reference.

BACKGROUND OF THE INVENTION

Emergency vehicles, such as ambulances, fire engines, and police vehicles, are often in a hurry to arrive at their destination. Upon encountering heavy traffic, it is typical for these vehicles to signal their need to pass through such traffic unimpeded. This is typically carried out by flashing lights and sirens. It is important for drivers to be able to detect these signals so that they can make way for the emergency vehicles.

A driver who wishes to avoid being in an emergency vehicle's way may find it useful to know certain details about the emergency vehicle. For example, a driver may find it useful to have some idea of how far away the emergency vehicle is and whether it is moving towards or away from the driver. Such information provides the driver with an appropriate sense of urgency and an estimate of how much time is available to act in a manner that avoids impeding the emergency vehicle's progress.

It is also important for the driver to be able to localize the emergency vehicle, i.e., to determine the direction from which the emergency vehicle is approaching. This is because the driver's maneuver depends in part on which way the emergency vehicle is coming from.

All of this presupposes that the driver can actually hear the siren. It is for this reason that the siren is quite loud.

However, as a result of advances in acoustic engineering, the driver's ability to hear the siren can no longer be taken for granted. Modern passenger cabins in vehicles have been engineered to be sanctuaries of silence. Indeed, luxury car brands routinely tout their ability to isolate the passenger from loud noises present beyond the vehicle's often tinted-glass windows. What little remains of exterior noises is often drowned out by interfering signals within the cabin, such as music. As a result, it may be difficult for the driver to hear a siren, let alone to determine the direction from which it is being emitted.

An even more pressing difficulty arises from developments in autonomous vehicles. In such cases, there is no driver to hear the siren. Such autonomous vehicles therefore have the potential to become obstacles to emergency vehicles.

SUMMARY OF THE INVENTION

In one aspect, the invention features an apparatus comprising a siren detector that identifies those frequencies at which a siren is active and a siren localizer that localizes the siren based on those frequencies.

In another aspect, the invention features an apparatus comprising a detector for detecting a siren that is emitted by a siren source located at a particular direction relative to a motor vehicle and a localizer in communication with the siren source for estimating said particular direction. The motor vehicle includes a microphone array having a plurality of microphones, each of which connects to the siren detector. The siren detector is configured to identify those frequencies at which a siren is active and the localizer is configured to estimate the particular direction based on those frequencies.

Embodiments include those in which the detector includes a line detector and those in which the detector includes an edge detector.

Among the embodiments that include an edge detector are those in which the edge detector detects in different directions a spectrogram that represents the siren and those in which the edge detector detects lines in different directions that periodically recur on the spectrogram.

Embodiments also include those in which the detector assembles different line segments on a spectrogram in relation to each other, the spectrogram being that of the siren.

In other embodiments, the detector uses a dynamic system model to assemble different line segments on a spectrogram in relation to each other, the spectrogram being that of the siren.

In still other embodiments, the detector uses a dynamic system model to assemble different line segments on a spectrogram in relation to each other. The spectrogram is that of the siren and the dynamic system model describes evolution of the line segments' slopes over time.

Embodiments also include those in which the detector uses a dynamic system model to assemble different line segments on a siren's spectrogram in relation to each other. The line segments are assembled based on a tonal model that specifies frequencies that are present in the siren for specified durations.

In further embodiments, the detector relies on a partly linear model.

Among those embodiments in which the detector includes a line detector are those in which the detector provides, to the localizer, cross-phase spectral density or cross-power spectral density information from different microphones. In these embodiments the localizer relies at least in part on the spectral density information from different microphones to carry out localization.

In still other embodiments, the localizer relies at least in part on power spectral density information between different microphones. In other embodiments, the localizer relies at least in part on phase information between microphones.

In the examples described herein, the system and method are used in connection with an automobile. However, the system and method are usable for other types of motor vehicles. In addition, the vehicle need not be one that relies on a human operator in the vehicle. The system and method are also useful for remotely-operated vehicles.

Additionally, there is no requirement that the vehicle be operated by a human being. The system and method described herein is applicable for the case of autonomous vehicles. For example, an autonomous vehicle, like any other vehicle, should be able to move out of the way when an ambulance goes by. Similarly, an autonomous vehicle should be capable of pulling over to receive a ticket in response to being chased by a police car.

The methods and systems described herein solve a technical problem, namely that of determining a siren's direction-of-arrival. The technical solution has the technical effect of enabling a vehicle to change its velocity in a manner that prevents the vehicle from becoming an impediment to an emergency vehicle's forward progress. A concrete and practical technical effect is that emergency vehicles are able to arrive at their destinations sooner, thus increasing the probability of saving lives and property.

The systems described herein are non-abstract systems that are made of matter and that interact with the physical environment by responding to transmissions of acoustic energy. The methods claimed herein are implemented in a non-abstract manner. The methods are such that it is not practical to carry them out in the human mind or with pencil and paper. As used herein, "non-abstract" is defined as the converse of "abstract" as that term is understood by the Courts as of this application's priority date. Notice is hereby given that any person who construes the claims otherwise would be construing them in a manner inconsistent with the specification.

These and other features of the invention will be apparent from the following detailed description and the accompanying figures, in which

DETAILED DESCRIPTION

Figure 1:
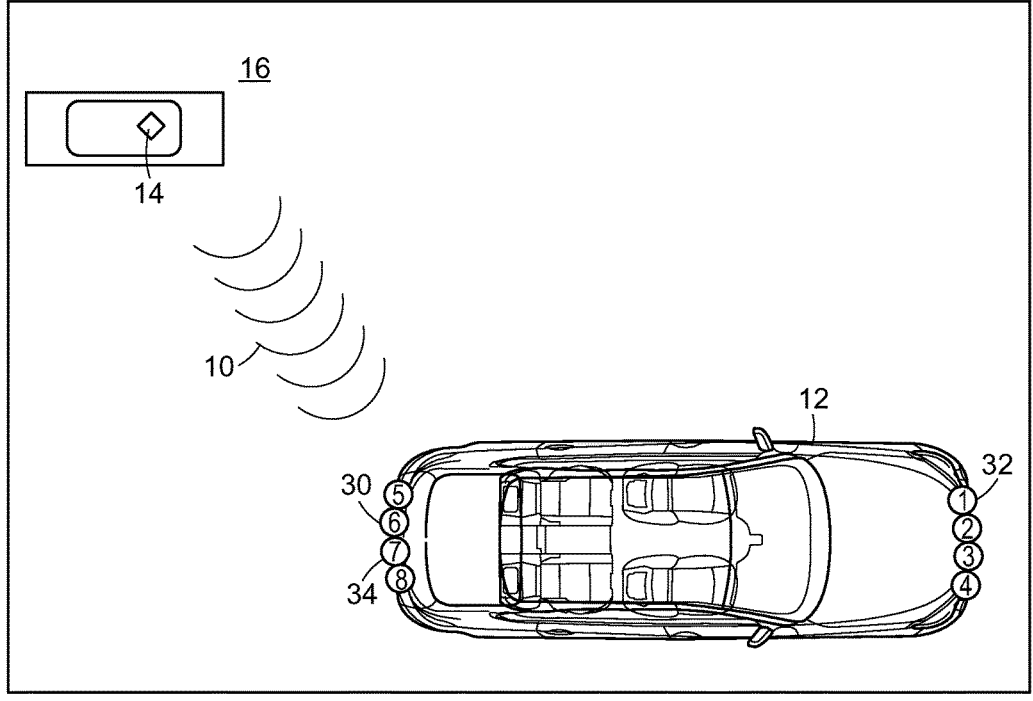
FIG. 1 shows an automobile having microphone arrays for detecting and localizing a siren.

FIG. 1 shows a siren 10 that is incident on an automobile 12. As suggested by the figure, the "siren" in this case is not the physical unit but a sound wave being emitted by a siren source 14 that is carried by an emergency vehicle 16.

In practice, different emergency vehicles emit different kinds of sirens. In fact, it is possible for the same emergency vehicle to itself emit different kinds of sirens. As a result, the siren 10 is one of several types of sirens. Each siren can be identified by its characteristic time-varying spectrum.

Figure 2:
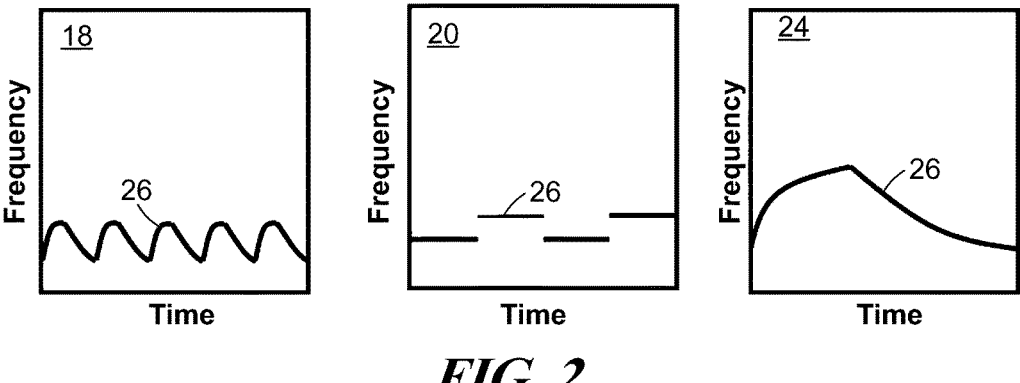
FIG. 2 shows spectrographs of time-varying fundamental frequencies of selected sirens.

FIG. 2 shows spectrograms for three types of siren 10: a yelp 18, a high-low 20, and a wail 24. Each spectrogram shows the siren's fundamental frequency as a function of time.

The high-low 20, which can be seen in the center frame, is characterized by a low steady pitch that jumps to a higher pitch, remains there for some period, and then falls back to the original low pitch. As such, the high-low 20 is characterized by two distinct tones. In contrast, the wail 24 and the yelp 18 are characterized by distinct frequency sweeps.

In a wail 24, which is shown in the right-most frame, the pitch rises smoothly from a low frequency to a high frequency and then decays continuously back to the low frequency, thus avoiding the discontinuous nature of the high-low 20.

A yelp 18, which is shown in the left-most frame, has a similar pattern as the wail 24. The yelp 18 can be viewed as a periodic version of a wail 24 but with a more rapid ascent to the highest frequency and a more rapid plunge back to the lowest frequency. The yelp 18 is particularly useful in an urban environment, in which acoustic multi-path reflections are likely.

Figure 3:
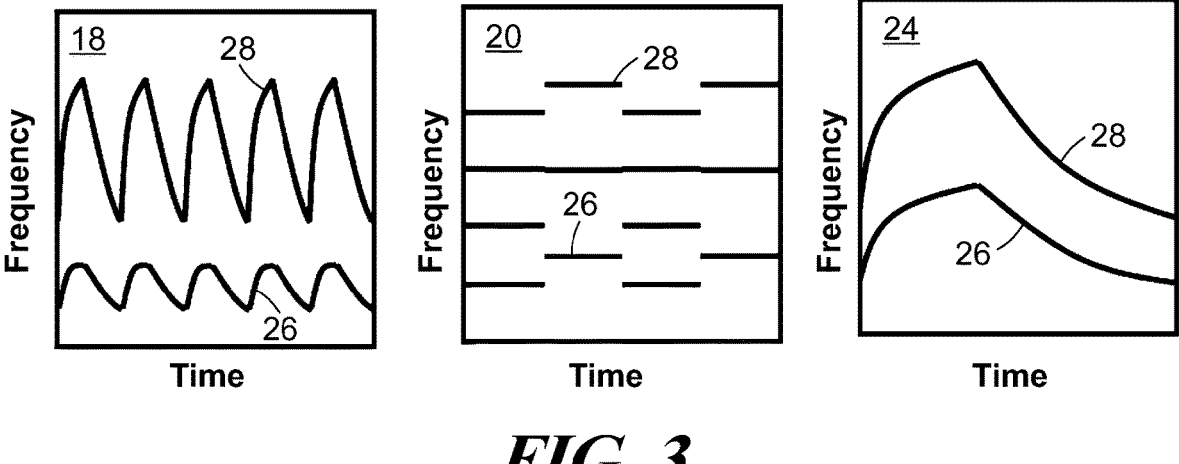
FIG. 3 shows examples spectrographs of the sirens in FIG. 2 but with a harmonic component.

In FIG. 2, only the time-varying fundamental frequency 26 is shown. FIG. 3 shows time-varying spectra for the same three sirens 18, 20, 24 with the addition of one or more harmonic components 28.

Referring back to FIG. 1, the automobile 12 has first and second microphone arrays 30, 32 mounted at front and rear ends thereof. Although two arrays 30, 32 are shown, it is nevertheless possible to carry out the procedure described herein using only one array. The locations of the arrays 30, 32 are provided only for example. The methods and systems described herein do not depend on the locations of the arrays 30, 32.

The first array 30 comprises two or more microphones 34. The microphones 34 connect to a detector 36 and to a localizer 38, as shown in FIG. 4.

The detector 36 detects the existence of a siren 10 and the times at which the siren 10 exists. It also identifies the type of siren 10. It does so by determining the time-varying spectrum for the siren 10 as received by the microphones 34 and comparing it with time-varying spectra of known sirens.

Figure 4:
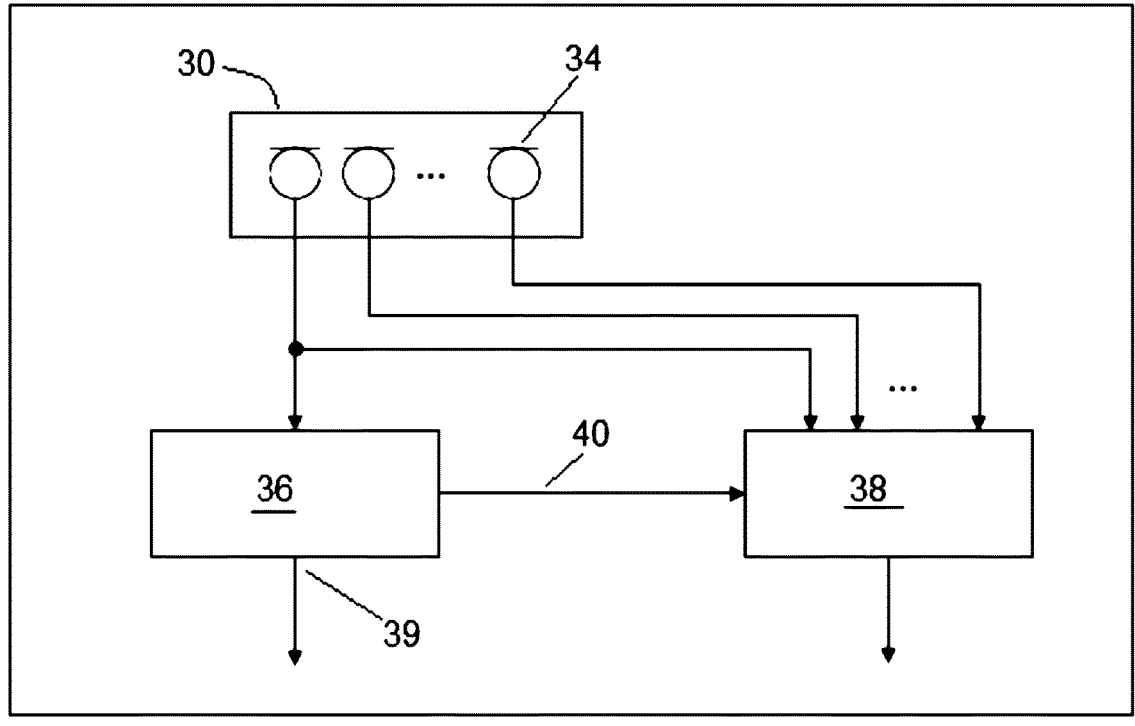
FIG. 4 is a block diagram of a system for detecting and localizing a siren.

Referring now to FIG. 4, the detector 36 has a first output 39 and a second output 40. The first output 39 identifies the result of having detected a siren 22. The second output 40 identifies the time-varying spectrum of the detected siren 10. The localizer 38 uses the second output 40 to estimate the siren's direction-of-arrival.

The spectrograms in FIGS. 2 and 3 show the sirens 10 as distinct lines that can be approximated by partly linear models. In these embodiments, the spectra are represented by narrow-band signals that are narrow enough to be regarded as tonal signals.

Accordingly, in some embodiments, a detector 36 relies at least in part on a line-detection procedure. Such a procedure exploits the recurring patterns of a siren 10 as seen in FIGS. 2 and 3. It does so by searching for recurring lines at specific frequencies with specific slopes. A dynamic system model describes the time evolution of the lines' slopes. Once the detector 36 has identified the lines corresponding to the siren's sounds in the spectrogram it makes them available at the second output 40 for use by the localizer 38. Examples of a detector 36 are described in U.S. Patent Publ. 2020/0025904, the contents of which are incorporated herein by reference.

The localizer 38 determines a direction-of-arrival by comparing received signals at different microphones 34. These signals have features from which one can infer a direction-of-arrival.

In some embodiments, the feature relied upon is a differential time-of-arrival across the array 30, 32. This delay in time corresponds to a phase shift in frequency. Such a phase shift can be identified based on cross-phase or cross-power spectral density of the microphone signals' spectra. This procedure includes identifying the direction-of-arrival by summing steered-response power over all frequencies, thus yielding a steered response power that depends only on direction-of-arrival. By identifying the direction-of-arrival that maximizes this frequency-independent steered response power, it is possible to estimate the siren's direction of arrival.

The steered response power for a particular direction-of-arrival and frequency is obtained by weighting the cross-spectral density between two microphones 34 at a particular time with a complex exponential that depends on the phase shift that results from an incident wave arriving at the two microphones 34 at different times.

In particular, for a wave incident on a microphone array 30, 32, it is possible to define a direction vector that identifies the wave's direction of arrival. For any pair of microphones 34 in the array, it is possible to identify a pair vector that represents the difference between the locations of the two microphones. An inner product of the pair vector and the direction vector, when divided by the velocity of sound, provides a measure of the differential time-of-arrival at the two microphones 34 of the pair. For each frequency, this provides a phase delay between the pair of microphones 34.

The signals received at the two microphones 34 are also characterized by a time-varying cross spectral density that depends on frequency. In some embodiments, it is useful to weight the cross-spectral density with a time-varying weight function that is indicative of the confidence that a siren source 14 was emitting a siren 10 with a particular frequency at a particular time.

In particular, let $m_i$ represent the position vector of the $i^{th}$ microphone 34 that receives a time-varying signal $x_i(t)$ having a spectrum of $X_i(t,\omega)$. In a three-dimensional Cartesian coordinate system, it is useful to define an elevation angle $\theta$ relative to the z axis and an azimuthal angle $\phi$ relative to the x axis. For a plane wave incident on the array 30, 32, it is possible to define a direction vector $a(\theta, \phi)$ that indicates the siren's direction-of-arrival. Such a direction vector takes the following form:

$$a(\varphi,\theta) = \begin{bmatrix} \cos(\theta) \cdot \cos(\varphi) \\ \cos(\theta) \cdot \sin(\varphi) \\ \sin(\theta) \end{bmatrix}$$

In general, a plane wave moving with velocity $v_{sound}$ and arriving from an azimuth angle $\varphi$ and an elevation angle $\theta$ will arrive at two microphones 34 at different times. The difference in the times of arrival, $\tau_{i,j}$ for microphones 34 defined by position vectors $m_i$ and $m_j$ is:

$$\tau_{i,j}(\varphi,\theta) = \frac{a(\varphi,\theta)^T \cdot (m_i - m_j)}{v_{sound}}$$

This time delay yields a corresponding phase delay $w_{i,j,\phi,\theta}(\omega)$, which is conveniently represented by a complex exponential:

$$w_{i,j,\phi,\theta}(\omega) = \exp(2\pi i \tau_{i,j}(\phi, \theta) / \omega)$$

Between any two microphones i and j, it is possible to define a cross spectral density by multiplying the conjugate of one microphone's spectrum with the other microphone's spectrum:

$$\Gamma_{i,j}(t, \omega) = X_i(t, \omega)^* \cdot X_j(t, \omega)$$

In some embodiments, it is useful to smooth the cross spectral density or to take an average over some time interval to obtain a more reliable estimate.

Using the above relations, the power in direction of a plane wave arriving from azimuth $\varphi$ and elevation $\theta$ in the frequency domain, hereafter referred to as the "steered response power," is:

$$SRP_t(\varphi,\theta,\omega) = \sum_{i,j=1}^{N} w_{i,j,\varphi,\theta}(\omega)^* \cdot \Gamma_{i,j}(t,\omega)$$

By summing over all frequencies, it is possible to obtain a total steered response power, $SRP_t(\varphi,\theta)$:

$$SRP_t(\varphi,\theta) = \sum_{\omega} SRP_t(\varphi,\theta,\omega)$$

The estimate of direction-of-arrival is then obtained by identifying the direction-of-arrival that maximizes this total steered response power:

$$\varphi_{t,max}, \theta_{t,max} = \mathrm{argmax}_{\varphi,\theta} \ SRP_t(\varphi, \theta)$$

This provides an estimate for the azimuth $\varphi_{t,max}$ and elevation $\theta_{t,max}$ of the siren's direction-of-arrival at time t.

In other embodiments, it is useful to apply a time-varying mask function to weight the cross spectral density with a value indicative of the confidence in the result. An example of such a mask $M(t, \omega)$ is:

$$M(t,\omega) = \begin{cases} 1, & \text{siren detected at time } t \text{ and frequency } \omega \\ 0, & \text{otherwise} \end{cases}$$

Multiplying the above mask with the cross spectral density $\Gamma_{i,j}(t, \omega)$ yields a modified cross spectral density:

$$\hat{\Gamma}_{i,j}(t, \omega) = M(t, \omega) \cdot \Gamma_{i,j}(t, \omega)$$

The mask need not be a binary function as shown. In general, the mask $M(t, \omega)$ is a value between zero and unity that conveys the certainty or confidence that a siren was active at time t and frequency $\omega$. A value of unity in such a case would mean high confidence of a detected siren and a value of zero would mean very low confidence of a detected siren.

In other embodiments, the feature relied upon is differential power. In this model, microphones 34 that are further from the siren source 14 output a signal with lower power than those closer to the siren source 14.

To the extent that the siren 10 is the loudest sound in the environment, determining the siren's direction-of-arrival can be carried out without having to consider the siren's characteristic spectrum.

However, in many cases, particularly when the siren is still far away, ambient traffic noise easily overwhelms the siren 10. This ambient traffic noise, which is distributed over a broad range of frequencies, hinders the localizer's operation. To overcome this difficulty, embodiments described herein rely at least in part on the siren's known time-varying spectrum or a rough model thereof utilizing dynamical system models or reoccurring lines in the spectrogram.

The localizer 38 exploits the fact that the siren 10 is band-limited. Therefore, the siren 10 exists in only a limited portion of the acoustic spectrum. As such, instead of processing interfering noise across a broad swath of frequencies, the localizer 38 filters out those components of the microphones' signals that are outside a limited portion of the frequency spectrum that is expected to also include the frequencies of the siren 10. The localizer 38 therefore essentially ignores those frequencies that are outside the band occupied by the siren 10. Instead, the localizer 38 processes only those components of the microphones' signals that are within those portions of the frequency spectrum that would be expected to also include the siren.

However, in order to retain only the siren's frequencies, the localizer 38 must know what those frequencies actually are. It learns what these frequencies are from the information provided at the detector's second output 40.

Figure 5:
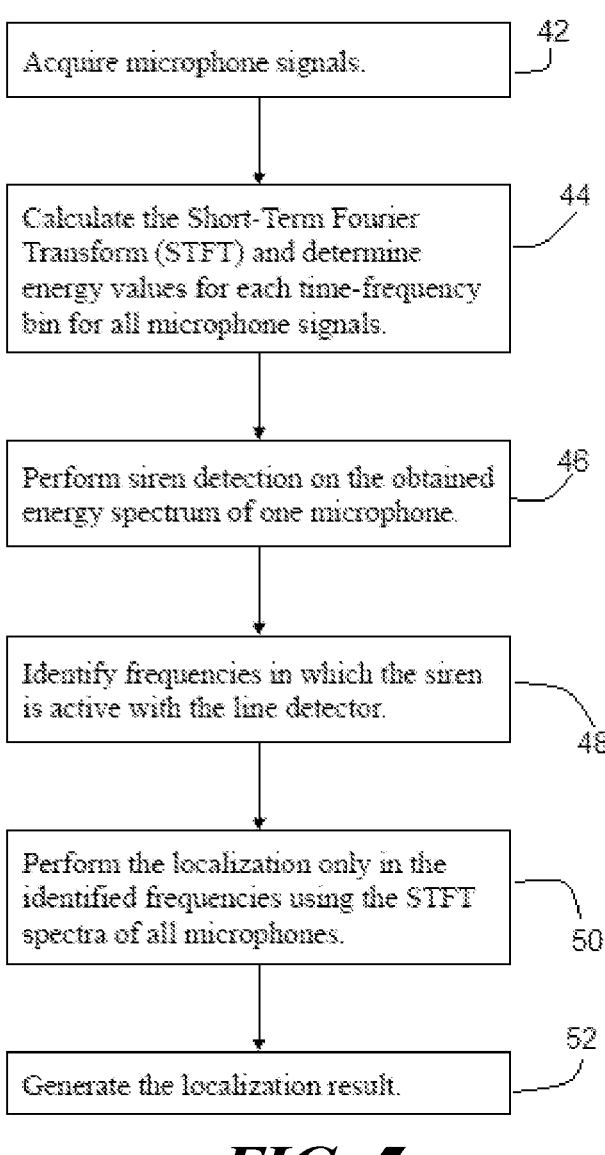
FIG. 5 is a flow chart of a procedure carried out by the system of FIG. 4.

Referring now to FIG. 5, the detector 36 begins by acquiring signals from the microphones 34 (step 42). Having done so, the detector 36 proceeds to calculate a short-term spectrum of the microphones' signals (step 44). In some practices of the illustrated method, the short-term spectrum is carried out using a Fourier transform.

In some practices, the detector 36 determines energy values for each time-frequency bin of each microphone signal. However, in other practices, the detector 36 simply determines the fundamental frequency and thus avoids having to inspect each time-frequency bin.

The detector 36 then uses the energy spectrum of the signal provided by one of the microphones 34 to detect the existence of a siren 10 (step 46) and to then identify those frequencies at which the siren 10 is active (step 48).

The detector 36 provides the foregoing information to the localizer 38, which then proceeds to use this information, together with the signals from all the microphones 34, to localize the siren (step 50). It does so by only using those frequencies that have been identified by the detector 36 as being occupied by an active siren's spectrum.

Some practices of the illustrated method feature the use of bandpass filters to filter signals from the microphones. These bandpass filters are tuned to pass one or more frequencies or frequency bands of the siren. A direction-finding procedure then operates on the filtered outputs of the microphones. Some practices combine the filtering and direction-finding operations. An example of a suitable technique for combining such operations includes generalized cross-correlation.

Upon completion, the localizer 38 then generates and displays the result of localization for the driver's benefit (step 52). In autonomous vehicles, the localization result is forwarded to the autonomous driving system, where it is used to determine whether an evasive maneuver is necessary or to plan the best route to yield to the emergency vehicle.

Suitable methods used by the localizer 38 to carry out direction finding include inspection of cross correlations between signals from the individual microphones 34. Such cross-correlation methods include generalized cross correlation. A particularly useful form of cross correlation is one in which the integration of the signals is weighted based on information that is known about the type of siren 10 that has been detected by the detector 36. However, the ability to exploit the known spectrum of the siren 10 in this way is advantageous when applied to other direction-finding methods.

Other methods used by the localizer 38 include a steered response power method. In such cases, the localizer 38 steers the array 32, 34 across multiple directions-of-arrival and, for each such direction, determines the power received from that direction in some band of frequencies.

After having swept across the various candidate directions-of-arrival, the localizer 38 then identifies the direction having the highest incident power as the best estimate for the siren's direction-of-arrival. Information concerning the siren's spectrum provides a basis for assigning the aforementioned mask that weights the various frequencies based on how likely it is that energy from a siren 10 is present at that frequency.

The weight can be one that varies continuously as a function of some parameter, such as signal energy or noise estimates. However, for cases in which the signal-of-interest is sparse when plotted in the time-frequency plane, as is the case for the sirens 10 shown in FIGS. 2 and 3, it is useful to use a binary-weighting method that simply excludes those time-frequency bins that do not contain energy from the siren 10.

Although the foregoing procedure can be carried out with a single array, the existence of two or more arrays disposed around the automobile 12 provides the opportunity to avoid effects due to shading. Such shading arises from interference from the automobile 12 itself when the automobile 12 lies between the siren source and the array. Thus, in the embodiment shown in FIG. 1, it is preferable to use the first array 30 when the siren source lies ahead of the automobile 12 and to use the second array 32 when the siren source 14 lies behind the automobile 12.

In embodiments that choose between the first and second arrays 30, 32, the act of choosing itself requires a coarse localization step. One must, after all, first know which half plane the siren source 14 lies in. One way to achieve this is to exploit acoustic shadowing.

In some cases, the power received at microphones 34 that are located on different sides of the automobile 12 can differ by between twenty and thirty decibels depending on the siren's direction-of-arrival. This occurs, for example, as a result of acoustic shadowing. Such a result is particularly likely when the microphones have been integrated into the automobile's body.

Some embodiments exploit acoustic shadowing by determining signal power ratios between microphone pairs (i,j):

$$SPR_{i,j}(t) = \sum_{\omega} M(t,\omega) \cdot 20\log_{10}\left(\frac{X_i(t,\omega)}{X_j(t,\omega)}\right)$$

If the power ratio between signals received by microphones i and j exceeds a threshold, for example five decibels or ten decibels, the siren 10 is more likely to come from a direction that faces the automobile's body near the location of the i$^{th}$ microphone rather than from the direction nearer the j$^{th}$ microphone.

By taking advantage of acoustic shadowing, it is possible to obtain a rough estimate of the siren's direction-of-arrival. It is also possible to use acoustic shadowing as a basis for selecting which of several microphone arrays distributed around the automobile 12 should be used to obtain a more accurate estimate using the steered response power method described earlier.

Figure 6:
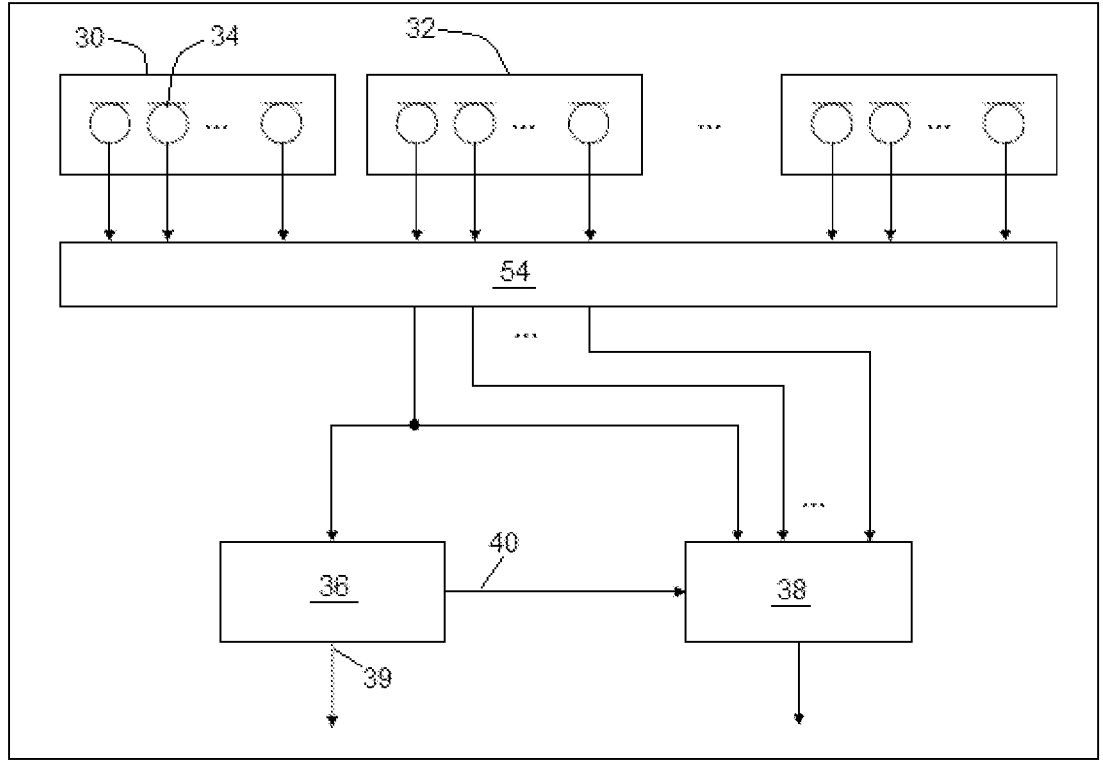
FIG. 6 shows a block diagram of a system that uses two or more arrays for detecting and localizing a siren.

Referring to FIG. 6, a system for using multiple arrays 30, 32 includes an array selector 54 that functions as a multiplexer for connecting an appropriately-selected array 32 to the system shown in FIG. 4. In some embodiments, the array selector 54 compares the power received at the two arrays 30, 32 and chooses the array 32 that has the higher power signal.

What is claimed is:

1. An apparatus comprising a detector for detecting a siren that is emitted by a siren source located at a particular direction relative to a motor vehicle and a localizer in communication with said detector for estimating said particular direction, said motor vehicle comprising a microphone array having a plurality of microphones, each of which connects to said siren detector, said siren detector being configured to identify those frequencies at which a siren is active and said localizer being configured to estimate said particular direction based on those frequencies, wherein the siren comprises recurring lines on a spectrogram, and wherein the detector includes a line detector that searches for said recurring lines, or an edge detector that detects edges of lines of said lines in said spectrogram.

2. The apparatus of claim 1, wherein the localizer is configured to localize the siren based at least in part on information indicative of an assembly of different line segments on a spectrogram that represents the siren, the line segments having been assembled in relation to each other.

3. The apparatus of claim 1, further comprising a dynamic system model, wherein the localizer is configured to localize the siren based at least in part on information indicative of different line segments that have been assembled in relation to each other using the dynamic system model, the line segments being representative of a time-varying spectrum of the siren as represented in a two-dimensional time-frequency space.

4. The apparatus of claim 1, further comprising a dynamic system model that models evolution of slopes of line segments over time, the line segments representing portions of a time-varying spectrum of the siren, wherein the localizer is configured to localize the siren based at least in part on information indicative of an assembly of the line segments in relation to each other as provided by the dynamic system model.

5. The apparatus of claim 1, further comprising a dynamic tonal model that specifies frequencies that are present in the siren for specified durations, wherein the localizer is configured to localize the siren at least in part on the basis of an assembly of line segments, each line segment representing a portion of a time-varying spectrum of the siren, the line segments having been assembled by the dynamic tonal model.

6. The apparatus of claim 1, wherein the detector relies on a partly linear model.

7. The apparatus of claim 1, wherein, to carry out localization, the localizer localizes said siren based at least in part on power spectral density information between different microphones.

8. The apparatus of claim 1, further comprising said array of microphones, said array of microphones being connected to both said localizer and to said siren detector.

9. The apparatus of claim 1, further comprising said motor vehicle, said motor vehicle comprising a first array of microphones mounted thereon, said first array of microphones being connected to both said localizer and to said siren detector, said localizer and said siren detector both being mounted in said motor vehicle.

10. The apparatus of claim 1, further comprising a motor vehicle, said motor vehicle comprising first and second arrays of microphones mounted thereon, said first and second arrays being connected to both said localizer and to said siren detector, said localizer and said siren detector both being mounted in said motor vehicle.

11. The apparatus of claim 1, further comprising an array selector that is configured to select a first microphone array among from a set of microphone arrays and to cause said first microphone array to be connected to said localizer and to said siren detector.

12. The apparatus of claim 1, further comprising an array selector that is configured to carry out a coarse localization of said siren and to select a first microphone array among from a set of microphone arrays based on said coarse localization, wherein as a result of said selection, said first microphone array connects to said localizer and to said siren detector to carry out a fine localization of said siren using said first microphone array.

13. The apparatus of claim 1, wherein said localizer is configured to determine a direction-of-arrival of a siren based at least in part on variations in signal power across outputs of different microphones in a microphone array.

14. The apparatus of claim 1, wherein said localizer is configured to determine direction-of-arrival of a siren based at least in part on phase differences between outputs of different microphones in a microphone array.

15. An apparatus comprising a detector for detecting a siren that is emitted by a siren source located at a particular direction relative to a motor vehicle and a localizer in communication with said detector for estimating said particular direction, said motor vehicle comprising a microphone array having a plurality of microphones, each of which connects to said siren detector, said siren detector being configured to identify those frequencies at which a siren is active and said localizer being configured to estimate said particular direction based on those frequencies, wherein the siren is represented by lines on the spectrogram and wherein the localizer is configured to localize the siren based on information indicative of the different directions of the lines on the spectrogram, or based at least in part on different directions of those lines that periodically recur on the spectrogram.

16. An apparatus comprising a detector for detecting a siren that is emitted by a siren source located at a particular direction relative to a motor vehicle and a localizer in communication with said detector for estimating said particular direction, said motor vehicle comprising a microphone array having a plurality of microphones, each of which connects to said siren detector, said siren detector being configured to identify those frequencies at which a siren is active and said localizer being configured to estimate said particular direction based on those frequencies, wherein said localizer is configured to localize the siren at least in part on the basis of cross-phase spectral density information or cross-power spectral density information from different microphones.

\* \* \* \* \*